(12) United States Patent
Herrmann et al.

(10) Patent No.: US 11,722,042 B2
(45) Date of Patent: Aug. 8, 2023

(54) METHOD FOR POTTING AN SSM ROTOR AND SSM ROTOR HAVING HYBRID ROTOR POTTING

(71) Applicant: AUDI AG, Ingolstadt (DE)

(72) Inventors: Patrick Herrmann, Pfaffenhofen a.d. Ilm (DE); Michael Schwarzer, Munich (DE); Paul Böckenhoff, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 181 days.

(21) Appl. No.: 17/222,083

(22) Filed: Apr. 5, 2021

(65) Prior Publication Data

US 2021/0336518 A1 Oct. 28, 2021

(30) Foreign Application Priority Data

Apr. 27, 2020 (DE) ...................... 10 2020 111 333.1

(51) Int. Cl.
*H02K 15/12* (2006.01)
*H02K 15/02* (2006.01)
(Continued)

(52) U.S. Cl.
CPC ....... *H02K 15/12* (2013.01); *B29C 45/14819* (2013.01); *B29C 45/1671* (2013.01);
(Continued)

(58) Field of Classification Search
CPC ............ H02K 15/12; H02K 1/26; H02K 1/28; H02K 15/024; B29C 45/14819;
(Continued)

(56) References Cited

U.S. PATENT DOCUMENTS 2,019,064 A * 10/1935 Apple .................... H02K 15/12
425/129.1
2,400,891 A * 5/1946 Sigmund .................. H02K 3/44
29/598
(Continued)

FOREIGN PATENT DOCUMENTS

CN 111327166 * 6/2020 ............. H02K 15/12
DE 101 33 966 A1 2/2003
(Continued)

OTHER PUBLICATIONS

English abstract, Scharlach, CN 111327166. (Year: 2020).*
(Continued)

*Primary Examiner* — Burton S Mullins
(74) *Attorney, Agent, or Firm* — Maier & Maier, PLLC

(57) ABSTRACT

A method for putting an SSM rotor, having the following steps: arranging the SSM rotor to be potted having upright alignment in a potting mold; introducing a first casting compound from below into the casting mold until a certain pre-fill level is reached, at which the first casting compound extends at least up to the lower end face of the rotor winding; introducing a second potting compound from above into the potting mold, wherein the second potting compound is poured onto the rotor winding and is drawn into the rotor winding; further introducing of the first potting compound from below into the potting mold until a certain final fill level is reached; and curing of the potting compounds.

16 Claims, 1 Drawing Sheet

(51) Int. Cl.
*H02K 1/26* (2006.01)
*B29C 45/14* (2006.01)
*H02K 1/28* (2006.01)
*B29C 45/16* (2006.01)
*B29L 31/00* (2006.01)
*B29K 63/00* (2006.01)
*B29K 67/00* (2006.01)

(52) U.S. Cl.
CPC ................. *H02K 1/26* (2013.01); *H02K 1/28* (2013.01); *H02K 15/024* (2013.01); *B29K 2063/00* (2013.01); *B29K 2067/00* (2013.01); *B29L 2031/7498* (2013.01)

(58) Field of Classification Search
CPC ............ B29C 45/1671; B29K 2063/00; B29K 2067/00; B29L 2031/7498
See application file for complete search history.

(56) References Cited

U.S. PATENT DOCUMENTS

| | | | | |
|---|---|---|---|---|
| 5,015,159 | A * | 5/1991 | Mine | H02K 15/12 123/41.31 |
| 7,423,406 | B2 * | 9/2008 | Geniusz | H02P 9/007 318/609 |
| 8,963,476 | B2 * | 2/2015 | Illiano | H02P 9/302 363/175 |
| 10,183,427 | B2 * | 1/2019 | Yomoda | B29C 45/02 |
| 11,196,326 | B2 * | 12/2021 | Fujiwara | H02K 3/34 |
| 11,342,824 | B2 * | 5/2022 | Duricic | H02K 15/12 |
| 11,456,630 | B2 * | 9/2022 | Barti | H02K 15/10 |
| 2018/0326636 | A1 * | 11/2018 | Zschoke | B29C 45/14065 |
| 2021/0323206 | A1 * | 10/2021 | Schmid | B29C 45/14065 |

FOREIGN PATENT DOCUMENTS

| | | |
|---|---|---|
| DE | 10 2007 030 963 A1 | 1/2009 |
| EP | 2 887 507 A1 | 6/2015 |
| GB | 920656 A | 3/1963 |
| UA | 46328 U | 12/2009 |
| WO | 2019/115043 A1 | 6/2019 |

OTHER PUBLICATIONS

Examination Report dated Mar. 8, 2021 in corresponding German application No. 10 2020 111 333.1; 12 pages including Machine-generated English-language translation.
Wikipedia, "Multi-component injection molding"; URL: https://de.wikipedia.org/wiki/Mehrkomponenten-Spritzgie%C3%9Fen; 7 pages including Machine-generated English-language translation.

* cited by examiner

METHOD FOR POTTING AN SSM ROTOR AND SSM ROTOR HAVING HYBRID ROTOR POTTING

FIELD

The disclosure relates to a method for potting an SSM rotor for an electrical machine. The disclosure also relates to a potted SSM rotor.

BACKGROUND

A separately excited synchronous machine (SSM) is an electrical machine (E-machine) operable as a motor and/or generator having a stator, which has multiple spatially offset stator coils, and having a rotor, which is rotatably arranged in the stator and which is provided with at least one rotor winding functioning as an electromagnet. The rotor winding is typically formed from insulated copper wires. A separately excited synchronous machine has good efficiency and good power density.

The rotor winding can be permanently fixed using a potting compound, for example a plastic compound or the like, in order to prevent the rotor winding or the copper wires from slipping during operation, wherein high centrifugal forces and strong vibrations sometimes occur.

WO 2019/115043 A1 describes the application of a potting compound by injection molding. For this purpose, the rotor is inserted into a suitable injection molding tool, preferably standing vertically, and, preferably, encapsulated using a thermosetting plastic. (Very high) injection pressures of 500 bar and more are used.

SUMMARY

The disclosure is intended to provide a further method for potting an SSM rotor or for applying potting compound to an SSM rotor, using which a mechanically stable rotor structure can be achieved without high pressures.

This is achieved by the method according to the disclosure. The disclosure also extends to a potted SSM rotor. Additional features result analogously for both subjects of the disclosure from the dependent patent claims, the following description of the disclosure, and the figures.

The method according to the disclosure for potting an SSM rotor having a rotor body, which is preferably made up of stacked laminated rotor disks, and a rotor winding applied to it, wherein it is in particular an orthocyclic rotor winding (which is characterized by particularly small or narrow intermediate spaces), includes at least the following steps to be executed in this sequence:

- arranging the FSM rotor having upright or (axially) vertical alignment in a potting mold, in particular in a cylindrical potting mold and, if necessary, closing the potting mold.
- introducing a first (liquid) potting compound from below into the potting mold (initial casting or pre-casting) until a certain pre-fill level or a first fill level is reached in the potting mold, at which the first potting compound extends up at least as far as the lower end face of the rotor winding, preferably extends exactly up to the lower end face of the rotor winding, but in particular does not extend up to the upper end face of the rotor winding;
- introducing a second (liquid) potting compound from above into the potting mold, wherein the second potting compound is poured onto the rotor winding, in particular onto the upper end face of the rotor winding, in particular is trickled in, and penetrates or is drawn into the rotor winding, in particular due to a capillary effect, in particular until the rotor winding is completely filled or saturated;
- further or renewed introducing of the first (liquid) potting compound from below into the potting mold (finish casting) until a certain final fill level or a second fill level in the potting mold, at which in particular the first potting compound extends at least up to the upper end face of the rotor winding and in particular is above it, is reached;
- curing of the potting compounds, in particular by a self-reactive curing process or by thermal activation (i.e., by introducing heat), and optionally demolding the potted SSM rotor, wherein optionally subsequent complete curing of the potted SSM rotor can also be carried out in a furnace or the like.

The disclosure thus provides sequential potting of the SSM rotor using two potting compounds to fix the rotor winding or to apply potting compound. Due to the initial casting (casting on), first the rotor winding of the standing SSM rotor is sealed off to the bottom and possibly also laterally or radially by the first potting compound, so that the second potting compound subsequently penetrating from above into the rotor winding cannot drain off from the rotor winding downward and in particular also not laterally. After the rotor winding is saturated by the second potting compound or has "become soaked" with the second potting compound, the finish casting (finish potting) of the SSM rotor with the first potting compound can take place. Ideally, the second potting compound is then only located within the rotor winding, wherein in particular there are no longer air inclusions, and the first potting compound is located, in particular without air inclusions, in other rotor regions, for example in the rotor empty spaces, in particular in the winding chambers, and/or forms an axial and/or radial rotor shell. The two potting compounds form a kind of hybrid rotor potting (see below). An SSM rotor having such a hybrid rotor potting has a very high degree of filling and good mechanical stability or a mechanically stable winding fixation.

The first potting compound preferably has a higher viscosity (or a lower fluidity) and in particular also a higher density than the second potting compound. Both the first potting compound and the second potting compound are preferably a resin material, in particular the same resin material, for example a polyester resin or epoxy resin.

The second potting compound is preferably an unfilled resin material which, due to its low viscosity or high fluidity, can penetrate or be drawn into the rotor winding very well. The first potting compound is preferably a filled resin material, which inter alia has very good mechanical strength and stability properties. A filled resin material is understood in particular to mean that it is enriched using at least one filler, for example in the form of ceramic beads which can have, for example, a diameter of 20 µm to 200 µm, wherein the filler volume fraction is preferably at least 20 vol.-%, particularly preferably at least 40 vol.-%, and in particular at least 60 vol.-%. The second potting compound can also be a slightly or less filled resin material, the filler fraction of which is preferably less than the filler fraction of the first potting compound and is preferably less than 30 vol.-%, in particular less than 20 vol.-%.

The different viscosities and possibly also the different densities of the first and second potting compound (the first potting compound can have a density that is at least twice as high as the second potting compound) make thorough mixing during potting more difficult or prevent it and also promote the separation of the more liquid and lighter second potting compound upward (see below).

The first potting compound and/or the second potting compound can be introduced into the potting mold in a volume-controlled or amount-controlled manner. The volume or amount required in each case can be calculated or determined in experiments. It is preferably provided that the first potting compound and/or in particular the second potting compound are introduced into the potting mold in a visually-controlled manner Manufacturing tolerances, in particular in the rotor winding, can thus be taken into consideration. The visually-controlled introduction can take place manually or also automatically, for example by means of camera recording. For this purpose, the potting mold can be designed having a viewing window.

The SSM rotor can be potted, at least temporarily, in a vacuum, which means in particular that the potting mold is subjected to a vacuum at least in phases, preferably during the initial casting using the first potting compound and during the subsequent introduction of the second potting compound. The finish casting using the first potting compound can optionally also take place without a vacuum, so that the vacuum can be opened beforehand.

It is preferably provided that second potting compound, which has possibly been introduced excessively and/or has drained off from the rotor winding, and which separates or collects as the uppermost layer in the potting mold after the further introduction of the first potting compound, is suctioned off or removed in another suitable way, for example by scraping off, before the curing (of the potting compounds) or possibly also even during the curing. The potting mold can also be designed having an overflow or the like, via which an uppermost (liquid) second potting compound can be separated. Alternatively, the separated uppermost layer of second potting compound can also be mixed with a layer of first potting compound located underneath it before the curing or possibly even still during the curing, wherein separation is no longer possible during the remaining curing time. The uppermost layer of second potting compound can also be removed after the curing by mechanical post-processing, for example by turning.

An SSM rotor according to the disclosure for an electrical machine, in particular for a traction motor of a motor vehicle, has a rotor body and a rotor winding, in particular an orthocyclic rotor winding, applied to the rotor body. Furthermore, this SSM rotor has a hybrid rotor potting formed from two potting compounds in such a way that the rotor winding is potted or impregnated using a second potting compound and other rotor regions are potted using a first potting compound. This hybrid rotor potting is preferably produced or created using the method according to the disclosure. The method features of the method according to the disclosure described herein apply analogously to the SSM rotor according to the disclosure.

BRIEF DESCRIPTION OF THE FIGURES

In the following, the disclosure will be explained in greater detail with reference to the figures. The features shown in the figures and/or explained below can also be general features of the disclosure independently of certain combinations of features and refine the disclosure accordingly.

DETAILED DESCRIPTION

Figure 1A:
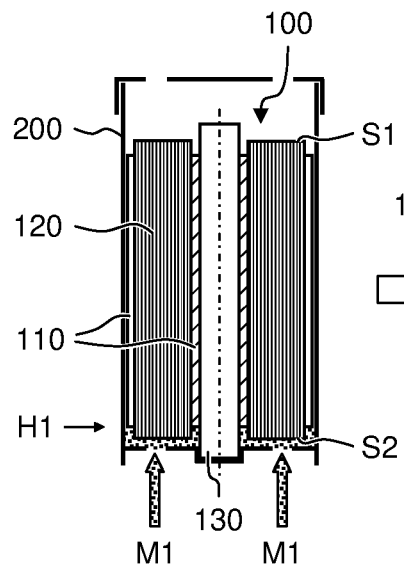
FIG. 1A schematically illustrates in an individual illustration a first preferred possible embodiment of the method according to the disclosure.

FIG. 1A shows, in a schematic axial sectional illustration, an FSM rotor 100 having a rotor body 110 and having a rotor winding 120, which is applied to the rotor body 110 and which can comprise multiple winding sections. The rotor winding 120 is preferably an orthocyclic winding. The rotor body 110 is preferably constructed from stacked laminated rotor disks. The rotor shaft 130 is already installed or inserted, wherein the rotor shaft, depending on the construction principle, can also be installed after the potting.

The SSM rotor 100 is arranged standing or vertically in a potting mold 200, which is also only shown schematically, in particular such that there is essentially no gap between the outer circumferential surface of the rotor body 110 and the inner wall of the potting mold 200. The rotor winding 120 has a lower end face S2 and an upper end face S1. The axial end regions of the rotor winding 120 are also referred to as winding heads. An axially central region of the rotor winding 120 extends between these end regions or winding heads.

The potting or impregnation of the SSM rotor 100 takes place in multiple steps, wherein two different potting compounds M1 and M2 are introduced sequentially into the potting mold 200, as explained below.

First, a first potting compound M1, that is a filled (liquid) resin material, is introduced into the potting mold 200 from below (so-called initial casting), for example by injection, until the rising potting compound M1 has reached a certain pre-fill height or filling height H1, at which it extends at least up to the lower end face S2 or up to the lower winding head of the rotor winding 120. This is illustrated in FIG. 1A.

Figure 1B:
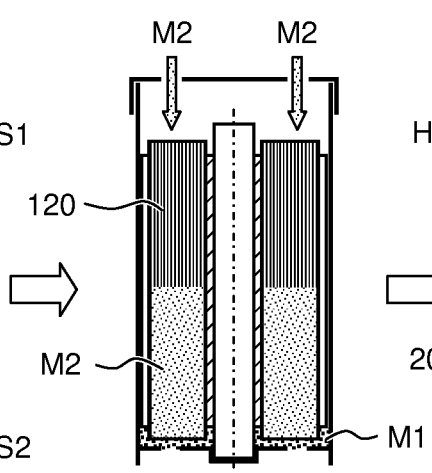
FIG. 1B schematically illustrates in an individual illustration a first preferred possible embodiment of the method according to the disclosure.

A second casting compound M2, that is an unfilled (low-viscosity) resin material, is then introduced into the casting mold 200 from above. The second potting compound M2 is poured onto the rotor winding 120, preferably similar to a trickling process, and is drawn into the rotor winding 120, in particular assisted by a capillary effect. This is illustrated in FIG. 1B. The first potting compound M1, which is already in the potting mold 200, prevents the second potting compound M2 from draining downward out of the rotor winding 120, i.e., the rotor winding 120 is quasi-sealed at the bottom by the first potting compound M1.

Figure 1C:
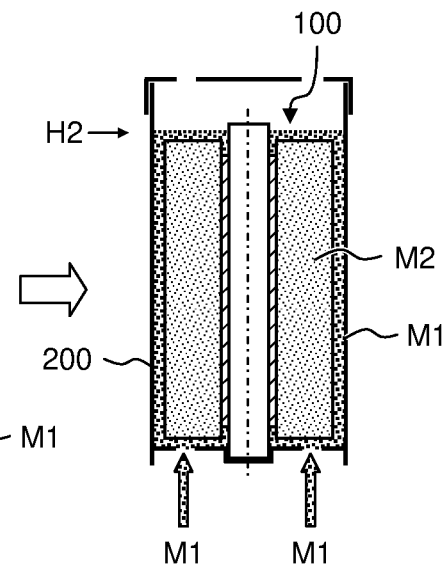
FIG. 1C schematically illustrates in an individual illustration a first preferred possible embodiment of the method according to the disclosure.

After the rotor winding 120 has been completely filled or soaked using the second potting compound M2, the first potting compound M1 is again introduced from below into the potting mold 200 (so-called finish casting) until the rising first potting compound M1 has reached a certain final fill level or finish fill level H2, at which this extends at least up to the upper end face S2 of the rotor winding 120 or covers the upper winding head. This is illustrated in FIG. 1C. Second potting compound M2 which has possibly been introduced excessively and/or has drained off from the rotor winding 120 separates as an upper layer in the potting mold 200 due to its lower viscosity and density compared to the first potting compound M1, which can then be handled accordingly, as described above.

The potting compounds M1 and M2 are now cured. After the potting compounds M1 and M2 have cured, the potting mold 200 can be opened and the potted SSM rotor 100 can be demolded. The casting mold 200 is preferably formed in multiple parts.

Figure 2A:
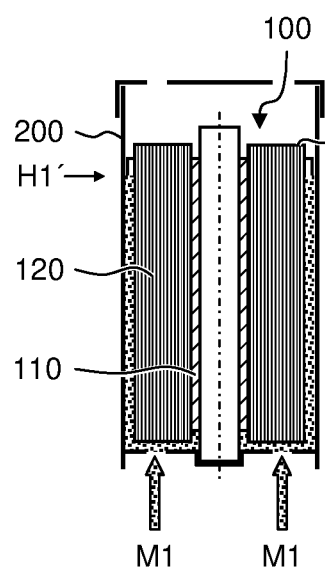
FIG. 2A schematically illustrates, analogously to FIG. 1A, a second preferred possible embodiment of the method according to the disclosure.
Figure 2B:
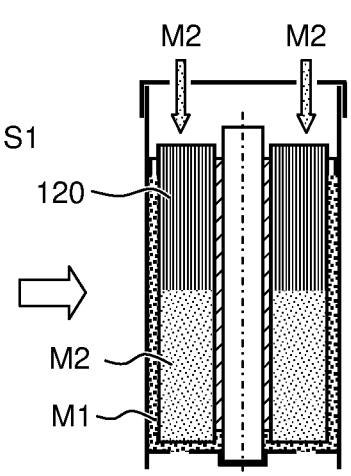
FIG. 2B schematically illustrates, analogously to FIG. 1B, a second preferred possible embodiment of the method according to the disclosure.
Figure 2C:
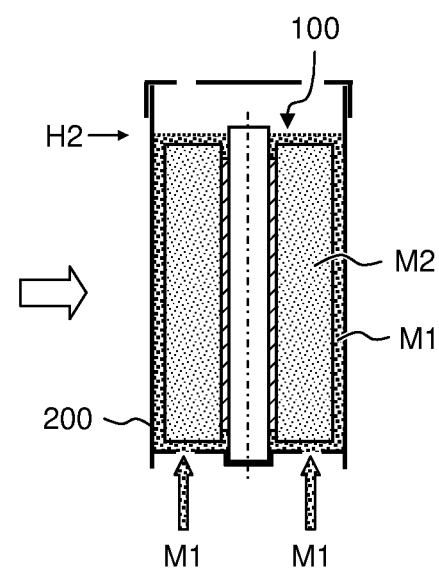
FIG. 2C schematically illustrates, analogously to FIG. 1C, a second preferred possible embodiment of the method according to the disclosure.

In the possible embodiment shown in FIG. 2, a higher fill level or pre-filling level H1' below the upper end face S1 is reached during casting (see FIG. 2a), without the first potting compound M1 (filled resin material) penetrating into the rotor winding 120 due to its comparatively high viscosity and density. The further steps are carried out analogously to the first possible embodiment (cf. FIG. 1 and the preceding explanations), wherein the first potting compound M1 not only seals the SSM rotor 100 or the rotor winding 120 at the bottom but also laterally or radially when the second potting compound M2 (see FIG. 2b) is introduced.

The invention claimed is:

1. A method for potting separately excited synchronous machine (SSM) rotor for an electrical machine, which has a rotor body and a rotor winding applied thereon, having the following steps:
    arranging the SSM rotor to be potted having upright alignment in a potting mold;
    introducing a first casting compound from below into the casting mold until a certain pre-fill level is reached, at which the first casting compound extends at least up to the lower end face of the rotor winding;
    introducing a second potting compound from above into the potting mold, wherein the second potting compound is poured onto the rotor winding and is drawn into the rotor winding;
    further introducing the first potting compound from below into the potting mold until a certain final fill level is reached; and
    curing of the potting compounds.

2. The method according to claim 1, wherein the first potting compound has a higher viscosity than the second potting compound.

3. The method according to claim 2, wherein the first potting compound is a filled resin material and the second potting compound is an unfilled or less filled resin material.

4. The method according to claim 2, wherein the first potting compound and/or the second potting compound are introduced into the potting mold in a volume-controlled manner.

5. The method according to claim 2, wherein the first potting compound and/or the second potting compound are introduced into the potting mold in a visually-controlled manner.

6. The method according to claim 2, wherein the potting of the SSM rotor takes place, at least temporarily, in a vacuum.

7. The method according to claim 1, wherein the first potting compound is a filled resin material and the second potting compound is an unfilled or less filled resin material.

8. The method according to claim 7, wherein the first potting compound and/or the second potting compound are introduced into the potting mold in a volume-controlled manner.

9. The method according to claim 7, wherein the first potting compound and/or the second potting compound are introduced into the potting mold in a visually-controlled manner.

10. The method according to claim 7, wherein the potting of the SSM rotor takes place, at least temporarily, in a vacuum.

11. The method according to claim 1, wherein the first potting compound and/or the second potting compound are introduced into the potting mold in a volume-controlled manner.

12. The method according to claim 11, wherein the potting of the SSM rotor takes place, at least temporarily, in a vacuum.

13. The method according to claim 1, wherein the first potting compound and/or the second potting compound are introduced into the potting mold in a visually-controlled manner.

14. The method according to claim 13, wherein the potting of the SSM rotor takes place, at least temporarily, in a vacuum.

15. The method according to claim 1, wherein the potting of the SSM rotor takes place, at least temporarily, in a vacuum.

16. The method according to claim 1, wherein second potting compound, which has been introduced excessively and/or has drained off from the rotor winding, and which separates the further introduction of the first potting compound as the top layer in the potting mold, is suctioned off before curing or mixed with a layer of first potting compound located underneath.

* * * * *